US012690517B2

(12) United States Patent
Dai

(10) Patent No.: US 12,690,517 B2
(45) Date of Patent: Jul. 28, 2026

(54) LAWN MOWER

(71) Applicant: SHAOXING SHANGYU GUANYE ELECTRICAL APPLIANCE CO., LTD., Shaoxing (CN)

(72) Inventor: Guangqian Dai, Shaoxing (CN)

(73) Assignee: SHAOXING SHANGYU GUANYE ELECTRICAL APPLIANCE CO., LTD., Zhejiang (CN)

( * ) Notice: Subject to any disclaimer, the term of this patent is extended or adjusted under 35 U.S.C. 154(b) by 384 days.

(21) Appl. No.: 18/271,726

(22) PCT Filed: Jan. 14, 2021

(86) PCT No.: PCT/CN2021/071832
§ 371 (c)(1),
(2) Date: Jul. 11, 2023

(87) PCT Pub. No.: WO2022/147849
PCT Pub. Date: Jul. 14, 2022

(65) Prior Publication Data
US 2025/0344636 A1     Nov. 13, 2025

(30) Foreign Application Priority Data
Jan. 7, 2021    (CN) .......................... 202110017144.8

(51) Int. Cl.
*A01D 34/81*        (2006.01)
*A01D 34/82*        (2006.01)
*A01D 101/00*       (2006.01)

(52) U.S. Cl.
CPC .............. *A01D 34/81* (2013.01); *A01D 34/82* (2013.01); *A01D 2101/00* (2013.01)

(58) Field of Classification Search
CPC .... A01D 34/00; A01D 34/001; A01D 34/005; A01D 34/67; A01D 34/828; A01D 34/81; (Continued)

(56) References Cited

U.S. PATENT DOCUMENTS 2,539,779 A * 1/1951 Grosso ................... A01D 34/63
                                                        15/337
2,906,082 A * 9/1959 Mathis ................. A01D 34/828
                                                       56/320.1

(Continued)

FOREIGN PATENT DOCUMENTS

CN         204104352 U  *  1/2015
CN         103843514 B  *  2/2016

(Continued)

OTHER PUBLICATIONS

FR 2315836 (Year: 1977).*
FR 2315836 (1977).

*Primary Examiner* — Adam J Behrens

(57)         ABSTRACT

A lawn mower comprising a lawn mower body, wherein a cutting chamber is arranged at the bottom of the lawn mower body, a blade is rotatably connected to the middle of the cutting chamber, and a plurality of first grass inlet channels communicated with the cutting chamber are arranged on the front side of the bottom of the lawn mower body, wherein the plurality of first grass inlet channels are provided with a supporting mechanism for improving the total bending resistance of the grass in the cutting process; during the traveling of the lawn mower body, the grass to be cut enters between the plurality of supporting pieces from the first grass inlet channels and the second grass inlet channels of the base of the supporting mechanism, and the top of the grass to be cut passes out from the supporting pieces.

7 Claims, 4 Drawing Sheets

(58) Field of Classification Search

CPC ...... A01D 34/82; A01D 75/18; A01D 75/185; A01D 2101/00

See application file for complete search history.

(56) References Cited

U.S. PATENT DOCUMENTS

| | | | | |
|---|---|---|---|---|
| 2,934,882 | A | * | 5/1960 | Kaut, Jr. .............. A01D 34/828 |
| | | | | 56/320.1 |
| 3,038,289 | A | * | 6/1962 | Cross .................... A01D 75/20 |
| | | | | 56/255 |
| 3,188,787 | A | * | 6/1965 | Weiland .............. A01D 43/063 |
| | | | | 56/16.5 |
| 3,312,049 | A | * | 4/1967 | Walker ................ A01D 34/828 |
| | | | | 56/255 |
| 3,665,693 | A | * | 5/1972 | Dacus .................. A01D 75/20 |
| | | | | 56/320.1 |
| 3,680,294 | A | * | 8/1972 | Dacus ................ A01D 34/828 |
| | | | | 56/320.1 |
| 4,037,396 | A | * | 7/1977 | Buchele .............. A01D 34/828 |
| | | | | 56/320.1 |
| 4,736,576 | A | * | 4/1988 | Mallaney .............. A01D 34/81 |
| | | | | 56/13.4 |
| 6,269,621 | B1 | * | 8/2001 | Fischier ................ A01D 34/74 |
| | | | | 56/320.2 |

| | | | | |
|---|---|---|---|---|
| 11,058,053 | B2 | * | 7/2021 | Patel .................... A01D 34/828 |
| 11,140,823 | B2 | * | 10/2021 | Hong .................... A01D 34/81 |
| 12,302,783 | B2 | * | 5/2025 | Baumann ............. A01D 34/828 |
| 2018/0184584 | A1 | * | 7/2018 | Song .................... A01D 34/008 |
| 2018/0184585 | A1 | * | 7/2018 | Song .................... A01D 34/74 |
| 2022/0183226 | A1 | * | 6/2022 | Paolo Andriolo ..... A01D 34/73 |

FOREIGN PATENT DOCUMENTS

| | | | | | |
|---|---|---|---|---|---|
| CN | 107771502 | A | * | 3/2018 | .......... A01D 75/185 |
| DE | 19947934 | A1 | * | 4/2001 | .......... A01D 34/828 |
| DE | 10048866 | A1 | * | 4/2002 | ............ A01D 34/81 |
| DE | 102004055902 | A | | 5/2006 | |
| DE | 102004055902 | A1 | * | 5/2006 | ............ A01D 34/81 |
| DE | 2006038553 | A1 | * | 2/2008 | ............ A01D 34/82 |
| DE | 102006038553 | A | | 2/2008 | |
| DE | 102006038553 | A1 | * | 2/2008 | ............ A01D 34/82 |
| DE | 102010046623 | A | | 3/2012 | |
| DE | 102010046623 | A1 | * | 3/2012 | ............ A01D 57/01 |
| EP | 3047719 | A1 | * | 7/2016 | .......... A01D 34/828 |
| FR | 2315836 | | * | 3/1977 | ............ A01D 34/81 |
| GB | 2283651 | A | * | 5/1995 | ............ A01D 34/73 |
| KR | 200177854 | Y1 | * | 4/2000 | ............ A01D 34/73 |
| KR | 200441536 | Y1 | * | 8/2008 | .......... A01D 34/828 |
| KR | 20150024543 | A | * | 3/2015 | ............ A01D 34/74 |

* cited by examiner

LAWN MOWER

TECHNICAL FIELD

This invention generally relates to the technical field of garden facilities, and more particularly, to a lawn mower with a supporting mechanism.

BACKGROUND

A lawn mower is a common tool used for the maintenance of an outdoor lawn, garden or playground grassland. The bottom of a lawn mower is normally provided with a cutting chamber, and the front side of the bottom of the lawn mower is provided with a plurality of first grass inlet channels communicated with the cutting chamber. A blade rotating along the horizontal plane is rotatably connected to the middle of the cutting chamber. The blade rotates at a certain height from the ground to cut off the excessively long grass, so that the lawn is kept flat and aesthetically appealing.

However, during the cutting process of the blade, the bending resistance of the grass itself is difficult to resist the cutting force of the blade, and at this point, when the cutting speed of the blade is low, the grass may be easily pushed down or torn apart in the cutting process. The higher the cutting speed of the blade is, the stronger the cutting force the grass instantaneously received from the blade is, which immediately generates an accelerated speed and an inertial force opposite to the traveling direction of the blade. The higher the cutting speed of the blade is, the larger the inertia force is, and the larger the total bending resistance of the grass is. Thus, a smooth cutting of the grass is facilitated.

Therefore, during the use of a conventional lawn mower, the following problems are inevitable: (1) when the cutting speed of the blade is low, the grass is easily pushed down or torn apart in the cutting process to cause miss cutting or uneven cutting; (2) although along the increase of the cutting speed of the blade, the problems that the grass is easily pushed down or torn apart in the cutting process are solved, the energy consumption in the cutting process is sharply increased when the blade operates at a high speed.

SUMMARY

The purpose of the present invention is to provide a lawn mower with a supporting mechanism. Through supporting the grass during the cutting process, the total bending resistance of the grass is significantly improved, achieving a smooth cutting of the grass at a lower cutting speed while reducing the power consumption during the cutting process.

To achieve the above purpose, the present invention adopts the following technical solution: a lawn mower comprises a lawn mower body, wherein a cutting chamber is arranged at the bottom of the lawn mower body, a blade is rotatably connected to the middle of the cutting chamber, and a plurality of first grass inlet channels communicated with the cutting chamber are arranged on the front side of the bottom of the lawn mower body, wherein the plurality of first grass inlet channels are provided with a supporting mechanism for improving the total bending resistance of the grass in the cutting process, and the supporting mechanism comprises a base detachably arranged on the plurality of first grass inlet channels and a plurality of supporting pieces arranged side by side on the base and extending to the lower portion the cutting chamber, wherein the base is provided with a plurality of second grass inlet channels respectively communicated with the plurality of first grass inlet channels, wherein the orthographic projection of the rotation range of the blade overlaps with the orthographic projections of the plurality of supporting pieces.

Through adopting the aforesaid technical solution, during the traveling of the lawn mower body, the grass to be cut enters between the plurality of supporting pieces from the first grass inlet channels and the second grass inlet channels of the base of the supporting mechanism, and the top of the grass to be cut passes out from the supporting pieces. At this point, when being cut by the blade, lots of grass supports each other between the two supporting pieces, and the supporting pieces are capable of supporting the grass as well, thereby improving the total bending resistance of the grass. Thus, a smooth cutting of the grass at a lower cutting speed is achieved, the situations that the grass is pushed down or torn apart in the cutting process are avoided, and the energy consumption in the cutting process is lowered.

In another preferred embodiment of the present invention, the lengths of the plurality of supporting pieces extending toward the cutting chamber are different. The connecting line of the end points of the plurality of support pieces close to one end of the cutting chamber is configured to be arc-shaped, and its center is located on the rotation center line of the blade.

Through adopting the aforesaid technical solution, at this point, when the blade rotates a single revolution to cut grass, along the traveling direction of the lawn mower body (namely, the extension direction of the first grass inlet channel), the length of the grass cut between any two adjacent supporting pieces is the same, thereby achieving a stable cutting of grass.

In another preferred embodiment of the present invention, along the extension direction of the first grass inlet channel, the length that the orthographic projection of the rotation range of the blade overlaps with the orthographic projection of the plurality of supporting pieces is not less than the ratio of the distance S meters travelled by the lawn mower body per second to n revolutions per second of the blade.

Through adopting the aforesaid technical solution, along the extension direction of the first grass inlet channel, the length of the grass cut in per revolution of the blade is the ratio of the distance S meters travelled by the lawn mower body per second to n revolutions per second of the blade. At this point, the length that the orthographic projection of the rotation range of the blade overlaps with the orthographic projection of the plurality of supporting pieces is not less than the ratio of the distance S meters travelled by the lawn mower body per second to n revolutions per second of the blade. In this way, the grass is effectively supported by the supporting pieces, ensuring that the total bending resistance of the grass is always improved such that a smooth cutting of the grass at a lower cutting speed of the blade is achieved.

In another preferred embodiment of the present invention, along the extension direction of the first grass inlet channel, the length that the orthographic projection of the rotation range of the blade overlaps with the orthographic projection of the plurality of support pieces is 10-30 mm.

Through adopting the aforesaid technical solution, when using the lawn mower body, the distance travelled by the lawn mower body per second is usually 0.6-0.8 meter, and the rotation speed of the blade is normally 3000-4000 revolutions per minute. When the distance travelled by the lawn mower body per second is 0.6 meter, and the rotation speed of the blade is normally 4000 revolutions per minute, the ratio of the distance S meters travelled by the lawn mower body per second to (n revolutions per second of the blade is the smallest. At this point, the ratio is 9 mm.

Therefore, the length that the orthographic projection of the rotation range of the blade overlaps with the orthographic projection of the plurality of support pieces is 10-30 mm. Therefore, the supporting effect of the supporting pieces on the grass during actual use is ensured, significantly improving the total bending resistance of the grass in the cutting process.

In another preferred embodiment of the present invention, the thickness of the supporting piece is 4-6 mm, and the distance between two adjacent supporting pieces is 30-40 mm.

Through adopting the aforesaid technical solution, the thickness of the supporting piece is 4-6 mm, and the distance between two adjacent supporting pieces is 30-40 mm. At this point, the thickness of the supporting piece is thinner, and the distance between the adjacent supporting pieces is larger. Therefore, the influence on the grass entering the cutting chamber via the first grass inlet channels and the second grass inlet channels is significantly reduced.

In another preferred embodiment of the present invention, the height of the supporting piece is 10-15 mm.

Through adopting the aforesaid technical solution, the height of the supporting piece is 10-15 mm. The support length to the grass is increased such that the total bending resistance of the grass is greatly improved.

In another preferred embodiment of the present invention, the distance between the upper surface of the supporting piece and the blade is 4-6 mm.

Through adopting the aforesaid technical solution, the distance between the upper surface of the supporting piece and the blade is 4-6 mm. When the grass is supported by the supporting piece, the distance between the blade and the upper surface of the supporting piece is short, which ensures the total bending resistance of the grass at a height where the blade operates.

In another preferred embodiment of the present invention, the base is fixedly connected to the plurality of first grass inlet channels through a plurality of bolts.

Through adopting the aforesaid technical solution, the base is fixedly connected to the plurality of first grass inlet channels through a plurality of bolts, achieving convenient disassembly and replacement.

DETAILED DESCRIPTION

Figure 1:
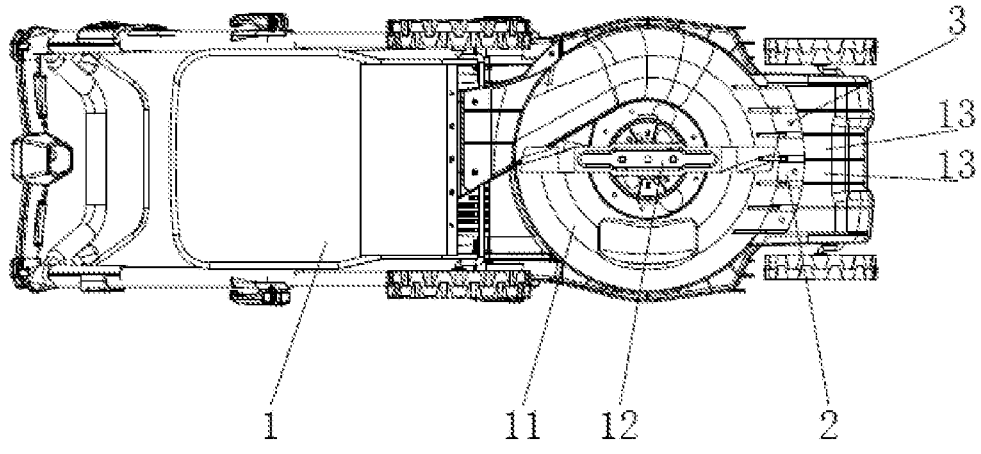
FIG. 1 is a schematic diagram illustrating an exemplary structure of the present invention.
Figure 2:
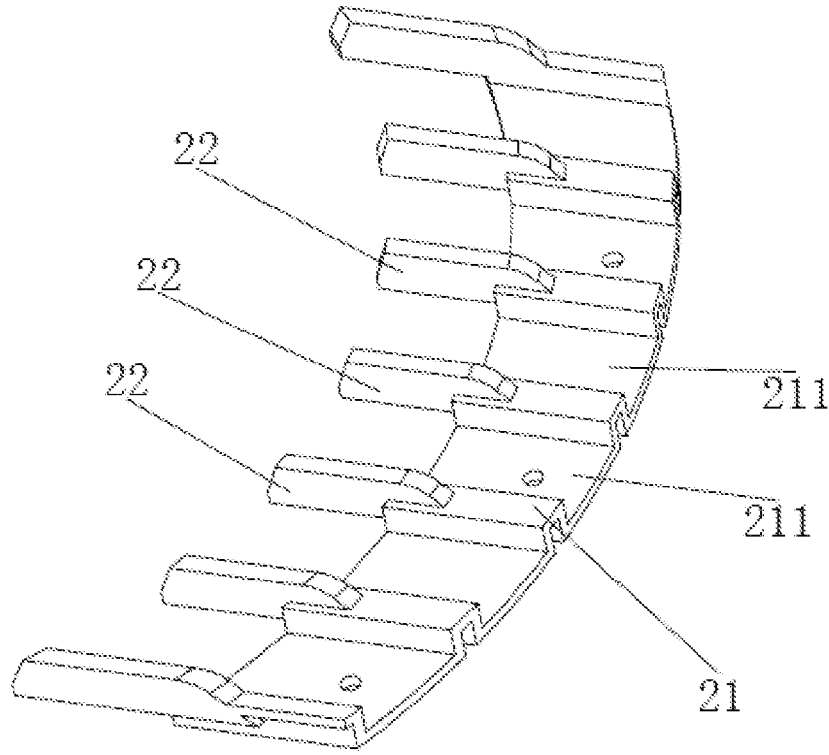
FIG. 2 is a schematic diagram illustrating an exemplary structure of the supporting mechanism of the present invention.
Figure 3:
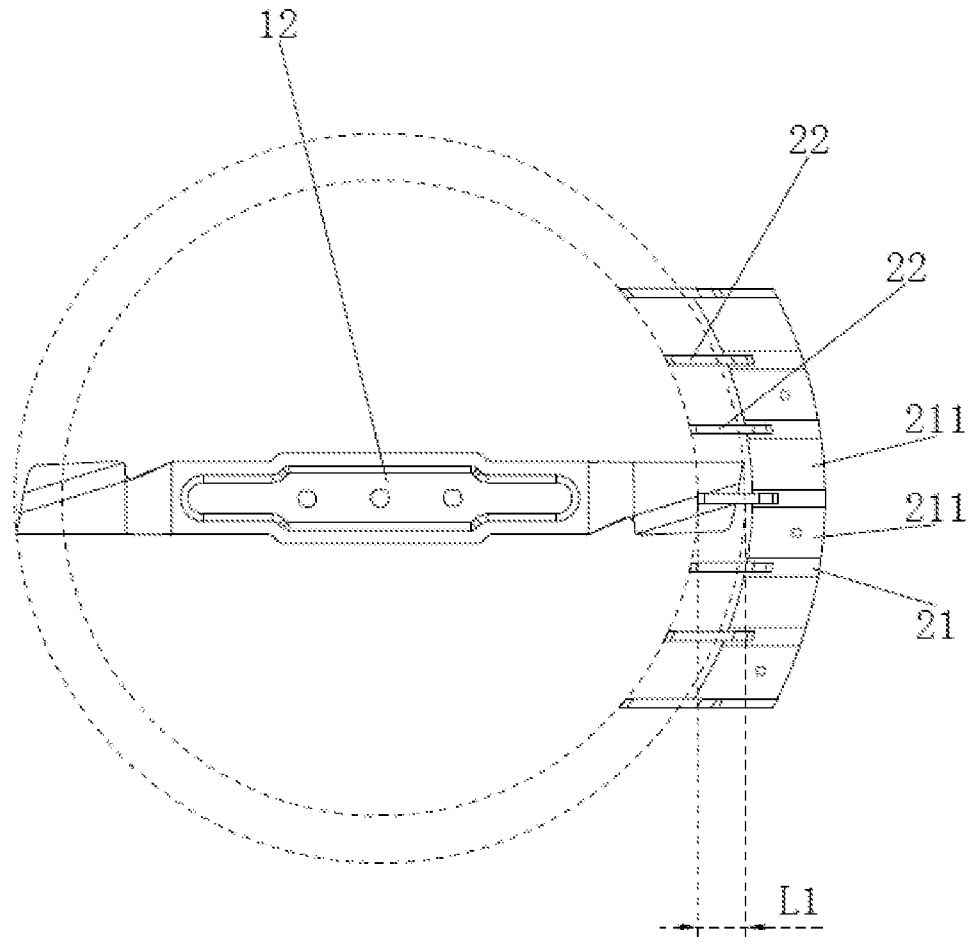
FIG. 3 is a schematic diagram illustrating a range that the blade overlaps with the supporting mechanism when the blade rotates.
Figure 4:
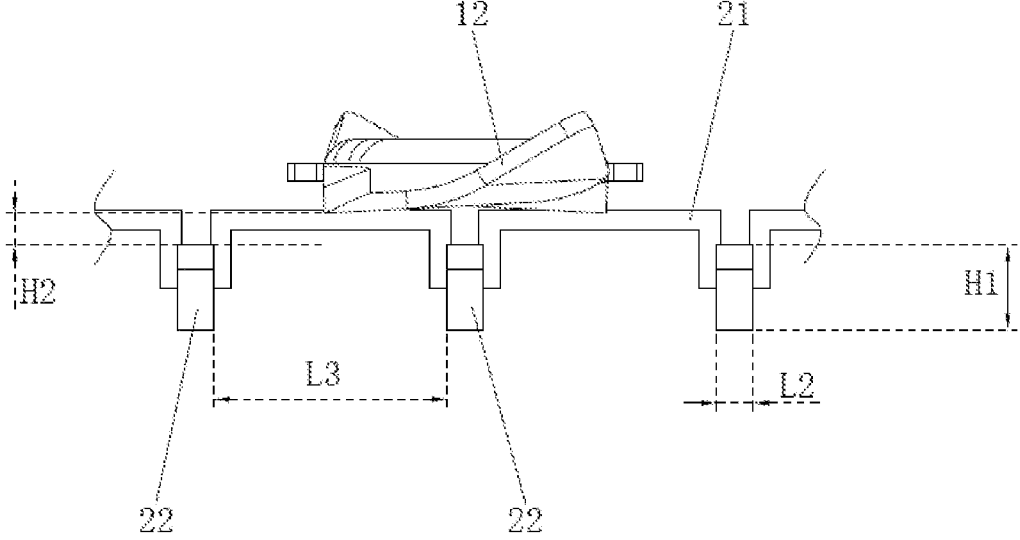
FIG. 4 is a sectional view illustrating a partial structure of the blade and the supporting mechanism; Marking instructions: 1-Lawn Mower Body, 11-Cutting Chamber, 12-Blade, 13-The First Grass Inlet Channel, 2-Supporting Mechanism, 21-Base, 211-The Second Grass Inlet Channel, 22-Supporting Piece, 3-Bolt.

Drawings are combined hereinafter to further elaborate the technical solution of the present invention.

Embodiment 1

The lawn mower of the present invention comprises a lawn mower body 1, wherein a cutting chamber 11 is arranged at the bottom of the lawn mower body 1, a blade 12 is rotatably connected to the middle of the cutting chamber 11, and a plurality of first grass inlet channels 13 communicated with the cutting chamber 11 are arranged on the front side of the bottom of the lawn mower body 1.

The plurality of first grass inlet channels 13 are provided with a supporting mechanism 2 for improving the total bending resistance of the grass in the cutting process, and the supporting mechanism 2 comprises a base 21 detachably arranged on the plurality of first grass inlet channels 13 and a plurality of supporting pieces 22 arranged side by side on the base 21 and extending to the lower portion the cutting chamber 11. The base 21 is provided with a plurality of second grass inlet channels 211 respectively communicated with the plurality of first grass inlet channels 13, the base 21 is fixedly connected to the plurality of first grass inlet channels 13 through a plurality of bolts 3, and the bolts 3 are mounted at places where the second grass inlet channels 211 and the first grass inlet channels 13 are located.

The orthographic projection of the rotation range of the blade 12 overlaps with the orthographic projections of the plurality of supporting pieces 22. The lengths of the plurality of supporting pieces 22 extending toward the cutting chamber 11 are different. The connecting line of the end points of the plurality of support pieces 22 close to one end of the cutting chamber 11 is configured to be arc-shaped, and its center is located on the rotation center line of the blade. Along the extension direction of the first grass inlet channel 13, the length that the orthographic projection of the rotation range of the blade 12 overlaps with the orthographic projection of the plurality of supporting pieces 22 (marked as L1) is not less than the ratio of the distance (S meters) travelled by the lawn mower body 1 per second to the rotation speed of the blade 12 (n revolutions per second). Along the extension direction of the first grass inlet channel 13, the length (L1) that the orthographic projection of the rotation range of the blade 12 overlaps with the orthographic projection of the plurality of support pieces 22 is 10-30 mm. When using the lawn mower body 1, the distance travelled by the lawn mower body 1 per second is usually 0.6-0.8 meter, and the rotation speed of the blade 12 is normally 3000-4000 revolutions per minute. When the distance travelled by the lawn mower body 1 per second is 0.6 meter, and the rotation speed of the blade 12 is normally 4000 revolutions per minute, the ratio of the distance (S meters) travelled by the lawn mower body 1 per second to the rotation speed of the blade 12 (n revolutions per second) is the smallest. At this point, the ratio is 9 mm (millimeters). Therefore, the length (L1) that the orthographic projection of the rotation range of the blade 12 overlaps with the orthographic projection of the plurality of support pieces 22 is 10-30 mm (millimeters).

The thickness (marked as L2) of the supporting piece 22 is 4-6 mm, and the distance between two adjacent supporting pieces 22 (marked as L3) is 30-40 mm. At this point, the thickness of the supporting piece 22 is thinner, and the distance between the adjacent supporting pieces 22 is larger. Therefore, the influence on the grass entering the cutting chamber 11 via the first grass inlet channels 13 and the second grass inlet channels 211 is significantly reduced. The height (marked as H1) of the supporting piece 22 is 10-15 mm. By means of this design, the support length to the grass is increased such that the total bending resistance of the grass is greatly improved. The distance between the upper surface of the supporting piece 22 and the blade 12 (marked as H2) is 4-6 mm, and through adopting this arrangement, when the grass is supported by the supporting piece 22, the distance between the blade 12 and the upper surface of the supporting piece 22 is short, which ensures the total bending resistance of the grass at a height where the blade 12 operates.

Effect of implementation: during the traveling of the lawn mower body, the grass to be cut enters between the plurality of supporting pieces from the first grass inlet channels and the second grass inlet channels of the base of the supporting mechanism, and the top of the grass to be cut passes out from the supporting pieces. At this point, when being cut by the blade, lots of grass supports each other between the two supporting pieces, and the supporting pieces are capable of supporting the grass as well, thereby improving the total bending resistance of the grass. Thus, a smooth cutting of the grass at a lower cutting speed is achieved, the situations that the grass is pushed down or torn apart in the cutting process are avoided, and the energy consumption in the cutting process is lowered.

The above is merely an explanation of the present invention, and the scope of the present invention is not limited to the embodiment described above. It should be noted that, after reading the specification of the present invention, various modifications may be made by those skilled in the art without paying creative labor. Therefore, these modifications shall fall into the scope defined by the claims of the present invention.

What is claimed is:

1. A lawn mower, comprising:
a lawn mower body (1), wherein a cutting chamber (11) is arranged at a bottom of the lawn mower body (1), a blade (12) is rotatably connected to a middle of the cutting chamber (11), and a plurality of first grass inlet channels (13) communicated with the cutting chamber (11) are arranged on a front side of the bottom of the lawn mower body (1), wherein the plurality of first grass inlet channels (13) are provided with a supporting mechanism (2) for improving a total bending resistance of grass during cutting, and the supporting mechanism (2) comprises a base (21) detachably arranged on the plurality of first grass inlet channels (13) and a plurality of supporting pieces (22) arranged side by side on the base (21) and extending to a lower portion of the cutting chamber (11), wherein the base (21) is provided with a plurality of second grass inlet channels (211) respectively communicated with the plurality of first grass inlet channels (13), wherein an orthographic projection of a rotation range of the blade (12) overlaps with orthographic projections of the plurality of supporting pieces (22),
wherein along an extension direction of the plurality of first grass inlet channels (13), a length that the orthographic projection of the rotation range of the blade (12) overlaps with the orthographic projections of the plurality of supporting pieces (22) is not less than a ratio of distance S meters travelled by the lawn mower body (1) per second to n revolutions per second of the blade (12).

2. The lawn mower of claim 1, wherein lengths of the plurality of supporting pieces (22) extending toward the cutting chamber (11) are different, wherein a connecting line of end points of the plurality of support pieces (22) close to one end of the cutting chamber (11) is configured to be arc-shaped, and its center is located on a rotation center line of the blade.

3. The lawn mower of claim 1, wherein along the extension direction of the plurality of first grass inlet channels (13), the length that the orthographic projection of the rotation range of the blade (12) overlaps with the orthographic projections of the plurality of support pieces (22) is 10-30 mm.

4. The lawn mower of claim 1, wherein a thickness of each of the plurality of supporting pieces (22) is 4-6 mm, and a distance between two adjacent supporting pieces (22) is 30-40 mm.

5. The lawn mower of claim 1, wherein a height of each of the plurality of supporting pieces (22) is 10-15 mm.

6. The lawn mower of claim 1, wherein a distance between an upper surface of each of the plurality of supporting pieces (22) and the blade (12) is 4-6 mm.

7. The lawn mower of claim 1, wherein the base is fixedly connected to the plurality of first grass inlet channels (13) through a plurality of bolts (3).

* * * * *